(12) United States Patent
Yamada (10) Patent No.: US 11,345,304 B2
(45) Date of Patent: May 31, 2022

(54) SIDE AIRBAG DEVICE

(71) Applicant: Autoliv Development AB, Vargarda (SE)

(72) Inventor: Atsushi Yamada, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/272,531

(22) PCT Filed: Jul. 19, 2019

(86) PCT No.: PCT/JP2019/028452
§ 371 (c)(1),
(2) Date: Mar. 1, 2021

(87) PCT Pub. No.: WO2020/049882
PCT Pub. Date: Mar. 12, 2020

(65) Prior Publication Data
US 2021/0323497 A1    Oct. 21, 2021

(30) Foreign Application Priority Data
Sep. 5, 2018    (JP) .............................. JP2018-166183

(51) Int. Cl.
*B60R 21/231*    (2011.01)
*B60R 21/207*    (2006.01)

(52) U.S. Cl.
CPC ...... *B60R 21/23138* (2013.01); *B60R 21/207* (2013.01); *B60R 2021/23146* (2013.01); *B60R 2021/23153* (2013.01)

(58) Field of Classification Search
None
See application file for complete search history.

(56) References Cited

U.S. PATENT DOCUMENTS

| 5,564,735 | A | * | 10/1996 | Boy | ....................... B60R 21/21 |
| | | | | | 280/730.2 |
| 5,957,493 | A | * | 9/1999 | Larsen | .............. B60R 21/23138 |
| | | | | | 280/743.1 |
| 11,104,292 | B2 | * | 8/2021 | Fuma | ................... B60R 21/2338 |

(Continued)

FOREIGN PATENT DOCUMENTS

| CN | 1769102 A | * | 5/2006 |
| CN | 102414053 A | | 4/2012 |

(Continued)

*Primary Examiner* — Faye M Fleming
(74) *Attorney, Agent, or Firm* — Harness, Dickey & Pierce, P.L.C.; Stephen T. Olson (57) ABSTRACT

The side airbag device is composed of a cushion that expands and deploys toward the front of the vehicle in the vehicle cabin to restrain an occupant seated in a seat from the side, and an inflater that is encased in the cushion and supplies the gas that expands and deploys the cushion, wherein the cushion is provided with a first panel facing the side position of the occupant in an expanded and deployed state and a second panel joined to the first panel positioned on the opposite side of the occupant, of the first panel and second panel, an insertion hole is provided at a position near the rear end of one of the panels and a stud bolt is inserted to fasten the inflater to the vehicle structure, and the cushion is attached to the wall facing toward the front of the vehicle.

9 Claims, 6 Drawing Sheets

(56) References Cited

U.S. PATENT DOCUMENTS

2012/0038136 A1     2/2012  Feller et al.
2021/0245696 A1*    8/2021  Oh .................... B60R 21/23138

FOREIGN PATENT DOCUMENTS

| EP | 2424752 A1 | | 3/2012 | |
|----|---|---|---|---|
| FR | 2781738 A1 | * | 2/2000 | ........... B60R 21/213 |
| JP | 2005-22473 A | | 1/2005 | |
| JP | 2006-224817 A | | 8/2006 | |
| JP | 2012-525297 A | | 10/2012 | |
| JP | 2015-214333 A | | 12/2015 | |
| WO | 2010/125099 A1 | | 11/2010 | |
| WO | WO-2014017211 A1 | * | 1/2014 | ........... B60R 21/235 |

* cited by examiner

SIDE AIRBAG DEVICE

TECHNICAL FIELD

The present invention relates to an airbag device.

BACKGROUND

Airbags are provided in recent vehicles. A side airbag apparatus is a safety apparatus which is operated in case of an emergency such as a vehicle collision and, for example, includes a bag shaped cushion. There are various types of airbags, depending on the installation site and application. For example, a front airbag is provided in a center of a steering wheel to protect a driver from a collision in a front-back direction. Furthermore, a curtain airbag that expands and deploys along a side window from the roof in the vicinity of a wall portion, a side airbag that expands and deploys to an immediate side of the passenger from a side portion of a seat, and the like, are provided in order to protect a passenger from a side collision or a subsequent rollover.

RELATED ART DOCUMENTS

Patent Documents

Patent Document 1: Japanese Unexamined Patent Application 2006-224817
Patent Document 2: Japanese Unexamined Patent Application 2015-214333

SUMMARY OF THE INVENTION

Problem to be Solved by the Invention

There is a problem with the airbag device disclosed in Patent Document 1 in that a tether is provided for two panels in order to adjust the expansion form of the airbag as well as that there is a large number of parts and therefore assembly work is complicated.

There is a problem with the airbag device disclosed in Patent Document 2 in that adjustment of the expansion form is based on a folding process of the cushion constituting the airbag and therefore assembly work is complicated.

In light of the circumstances described above, an object of the present invention is to provide a side airbag device where adjustment of the expanded form is performed without providing a tether for shape adjustment or performing shape adjustment based on the folding process of the cushion.

Means for Solving the Problem

The side airbag device of the present disclosure is provided with a cushion that expands and deploys towards the front of the vehicle in the vehicle cabin to restrain an occupant seated in a seat from the side, and an inflater that is encased in the cushion and supplies the gas that expands and deploys the cushion, the cushion being provided with a first panel facing the side position of the occupant in an expanded and deployed state and a second panel joined to the first panel positioned on the opposite side of the occupant, where of the first panel or second panel, one of the panels is provided with an insertion hole positioned near the rear end of the panel where a stud bolt is inserted to fasten the inflater to the vehicle structure, and using the stud bolt, the cushion is attached to the wall facing the front of the vehicle at the side of the occupant together with the inflater.

According to the present disclosure, when the cushion expands and deploys, the length of the first panel and the second panel from the stud bolt toward the front of the vehicle are different in the front-rear direction, such that the panel with a longer length in the front-rear direction (the panel on the side where the insertion hole is not provided) is deployed so as to twist toward the shorter panel (the panel in which the insertion hole is provided and the inflater is set). Thus, in the present disclosure, by asymmetrically attaching the first panel and the second panel, it is possible to control the direction in which the cushion is deployed, such that a tether to adjust the expansion form and adjusting the folding process of the cushion are not necessary, reducing the number of parts and thus simplifying assembly work.

According to the present disclosure, a housing is further provided in which the cushion and the inflater are stowed and is attached to the structure, and the wall surface is the rear wall surface provided on the housing wall toward the rear of the vehicle.

According to the present disclosure, the cushion and the inflater are contained in the housing, and of the walls that make up the housing, the cushion is attached to the rear wall surface that is toward the rear of the vehicle.

The side airbag device of the present disclosure is joined to the first panel and the second panel by sewing.

According to the present disclosure, by adopting sewing, the first panel and the second panel can be easily joined with high strength.

In the side airbag device of the present disclosure, when the cushion expands and deploys, the stitching lines of the first panel and the second panel are biased toward a side of one of the panels.

According to the present disclosure, the stitching lines are biased toward a side of one of the panels when the cushion expands and deploys, such that, for example, the stitching lines can be adjusted to be biased toward the outside of the vehicle so that the portions that are sewn together do not contact the occupant when the cushion expands and deploys, thereby reducing discomfort of the occupant.

With the side airbag device of the present disclosure, the first panel and the second panel have essentially the same shape and dimensions.

According to the present disclosure, preparing of differently shaped panels for inside panels and outside panels is not necessary to adjust the expansion form.

With the side airbag device of the present disclosure, the first panel and the second panel are constituted by one base material, and the first panel and the second panel are integrated in the portion of the cushion toward the front of the vehicle upon expansion and deployment of the cushion.

According to the present disclosure, since the integrated region is frontward, the stitching line is less likely to contact the occupant when the cushion is deployed, and the occupant is less likely to suffer from injuries such as abrasions. Also, the first panel has a region that is integrated with the second panel, and therefore, there is no need to sew the first panel and the second panel along the entire circumference.

The side airbag device of the present disclosure is a side airbag device for a rear seat provided in a rear seat of a vehicle.

According to the present disclosure, an occupant seated in the rear seat of the vehicle can be captured and protected from the side.

Effect of the Invention

According to the present disclosure, the expansion form can be adjusted without providing a tether for adjusting shape or adjusting shape based on folding of the cushion.

EMBODIMENT OF THE INVENTION

Embodiments of the present invention will be described below with reference to the diagrams.

Embodiment 1

Figure 1:
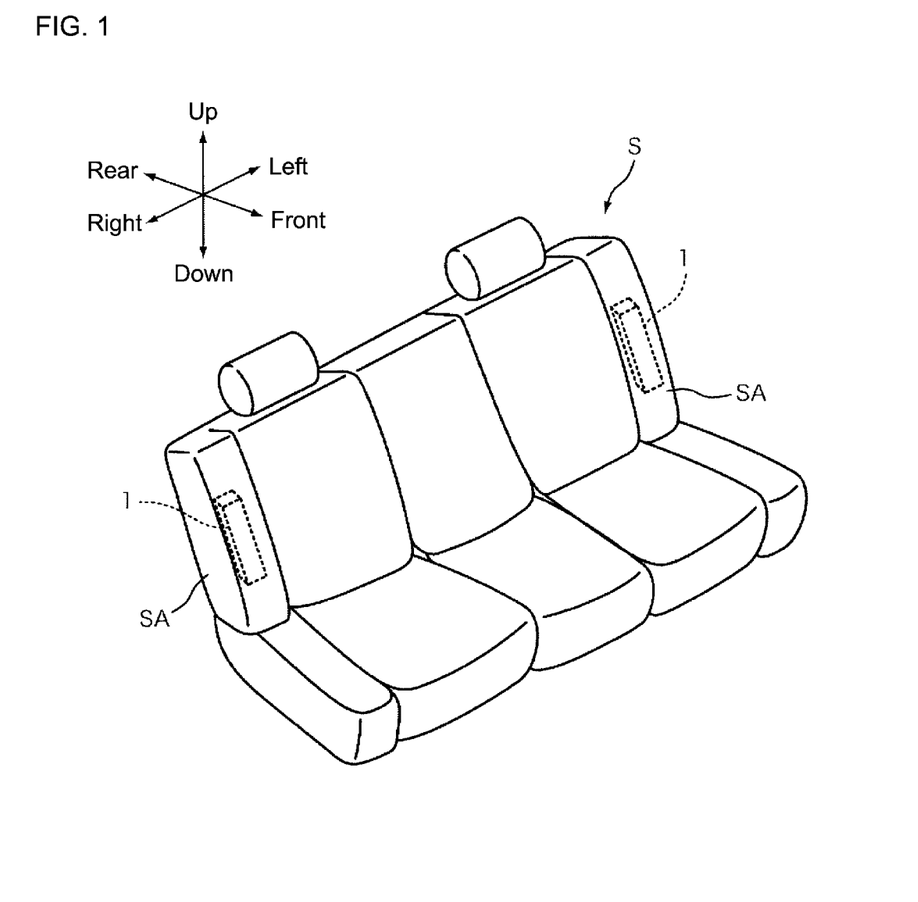
FIG. 1 is a schematic diagram of the interior of a vehicle equipped with the side airbag device according to embodiment 1.

FIG. 1 is a schematic diagram of the interior of a vehicle equipped with the side airbag device according to embodiment 1. A side airbag device 1 according to embodiment 1 is provided in the interior of the vehicle (the vehicle cabin), and the occupant seated in the seat is restrained from the side by a cushion 10 (see FIG. 2) that expands and deploys upon collision of the vehicle. Note that the front, right, left, and upper and lower directions for use in the following description are based on the front, rear, left, and top and bottom directions of a vehicle traveling on a road surface, as illustrated in the diagrams.

The vehicle is prepared with a rear seat S behind the driver seat and the passenger seat not illustrated. The rear seat S may include a seat, an arm rest, a headrest, and the like. The side airbag device 1 is attached to a structure in the vehicle cabin and provided in the space between the rear seat S and the rear door, for example. The structure to which the air side bag device [sic] is attached shall have a wall facing the front of the vehicle. One example of a structure is a side trim SA.

The side airbag device 1 is provided on both the left and right sides of the rear seat S. Since the left side airbag device 1 has a bilaterally symmetric structure to the side airbag device 1 on the right side, the following description mainly describes the side airbag device 1 on the right side, and the description for the side airbag device 1 on the left will be omitted. In addition, although the side airbag device 1 provided in the rear seat S is described for the present embodiment, the installation location of the side airbag device 1 is not limited to the side of the rear seat S, but may be the side of the driver seat or the side of the passenger seat.

Figure 2:
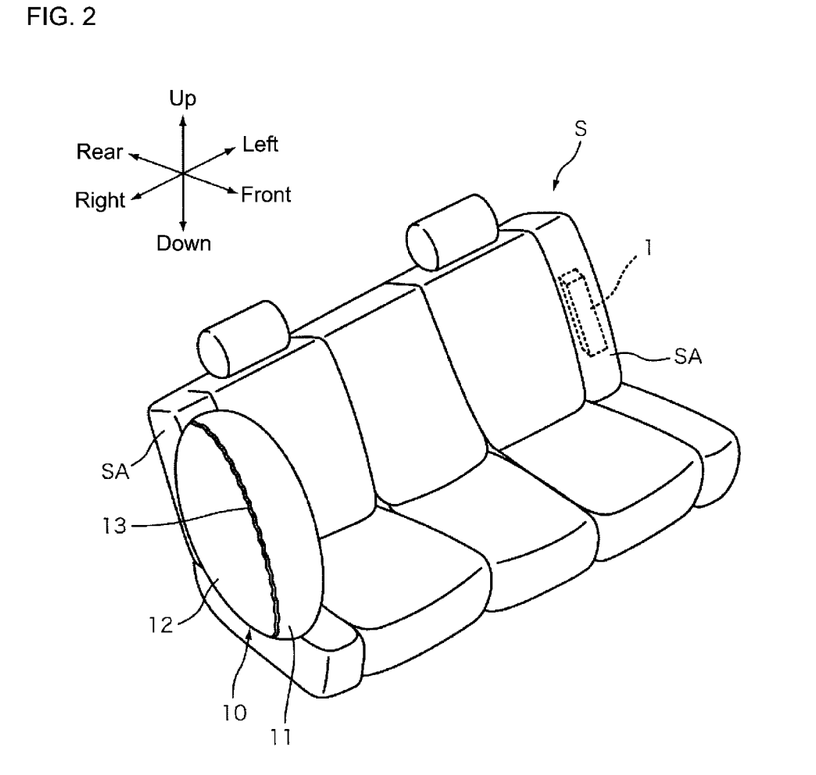
FIG. 2 is a perspective view illustrating the cushion equipped in the side airbag device in an expanded and deployed state.
Figure 3:
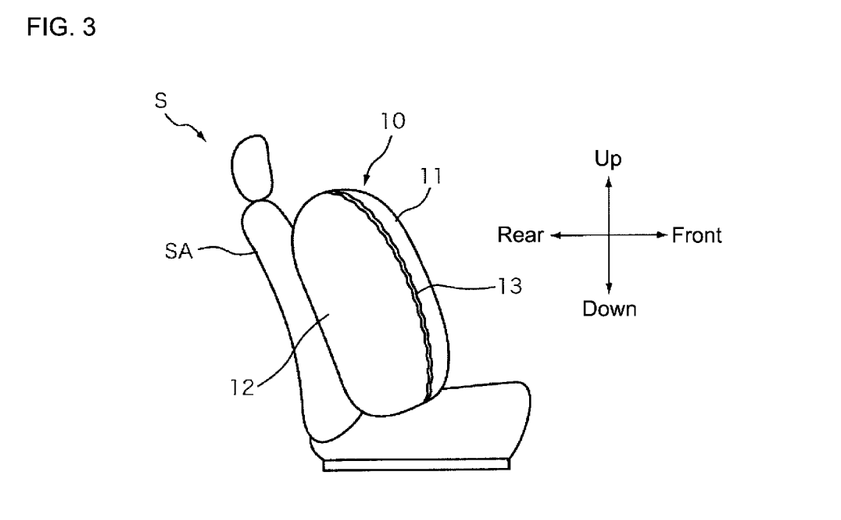
FIG. 3 is a right side view of the cushion equipped in the side airbag device in an expanded and deployed state.

FIG. 2 is a perspective view illustrating an expanded and deployed state of the cushion 10 provided in the side airbag device 1, and FIG. 3 is a right side view thereof. The cushion 10 provided in the side airbag device 1 includes an inner panel 11 (first panel) facing a lateral position of the occupant seated in the rear seat S when in an expanded and deployed state, and an outer panel 12 (second panel) positioned opposite the occupant relative to the inner panel 11. The inner panel 11 and the outer panel 12 are fabric members reinforced by weaving nylon fibers, for example, and are joined together by sewing to form a bag. Thus, the stitching line 13 formed when the inner panel 11 and the outer panel 12 are sewn together appears on the cushion 10.

Figure 6:
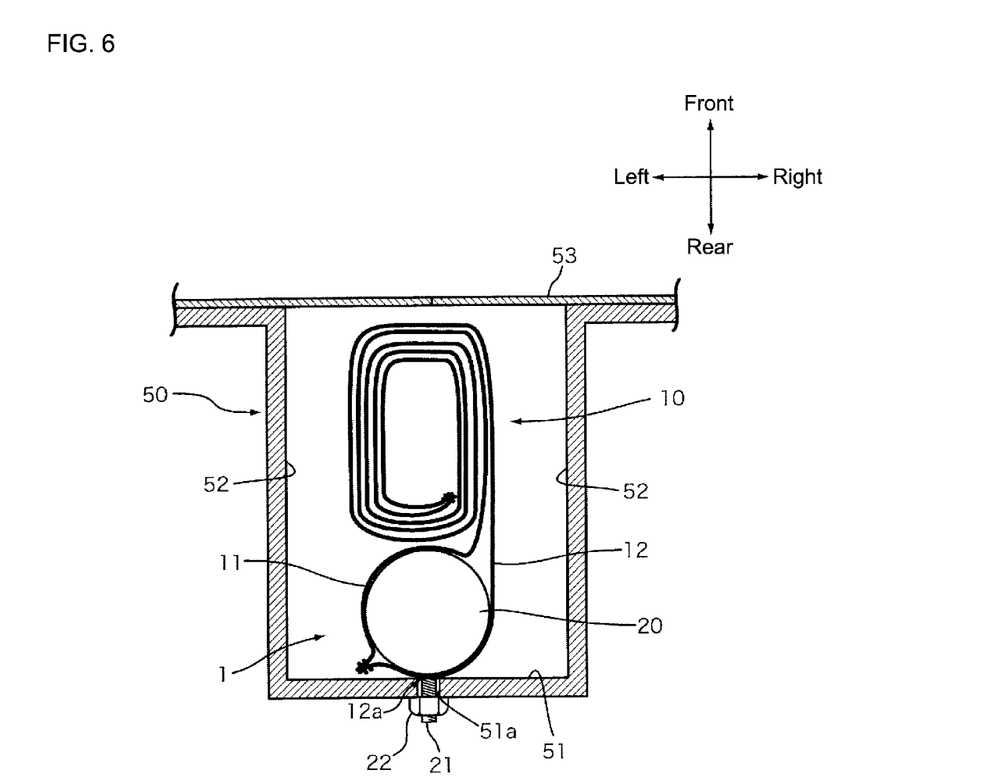
FIG. 6 is a schematic cross-sectional view illustrating the cushion equipped in the side airbag device in a stowed state.

An inflater 20 is contained within the inner portion of the cushion 10 (see FIG. 6). The inflater 20 operates in response to a collision or the like of the vehicle, and supplies gas for expanding and deploying the cushion 10. The cushion 10 expands and deploys toward the front of the vehicle inside the vehicle cabin through introduction of the gas supplied from the inflater 20. The occupant seated in the rear seat S is restrained from moving in the outward direction of the vehicle by the expanded and deployed cushion 10, and is protected from a secondary collision with the side structure of the vehicle cabin.

Figure 4:
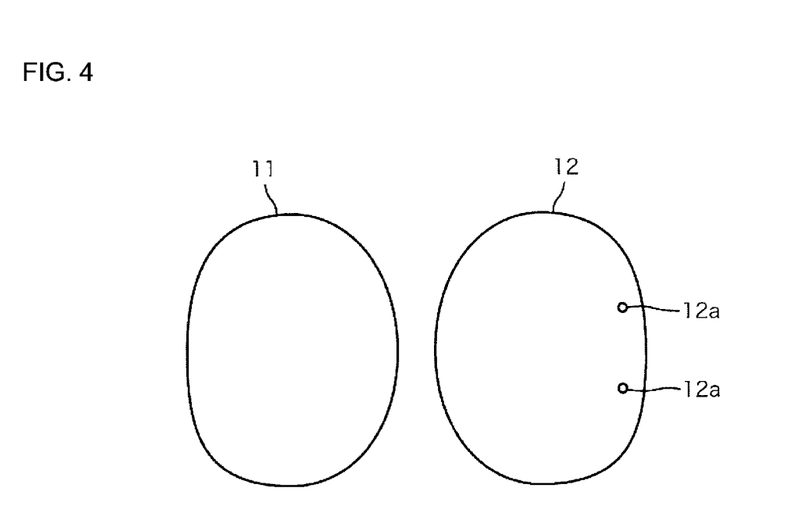
FIG. 4 is an exploded view of the cushion according to embodiment 1.
Figure 5:
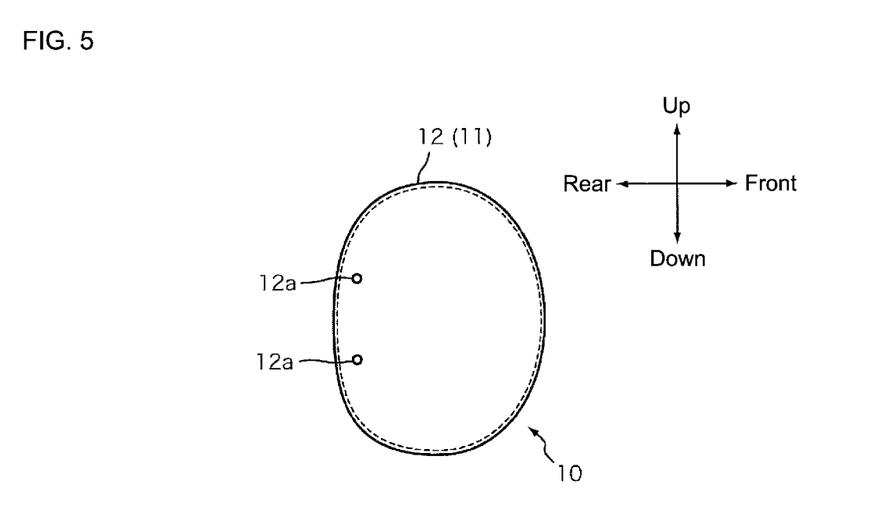
FIG. 5 is a schematic diagram illustrating the joined state of each panel.

FIG. 4 is an exploded view of the cushion 10 according to embodiment 1. In FIG. 4, the inner panel 11 and the outer panel 12 prior to joining are illustrated in a simplified manner. Both the inner panel 11 and the outer panel 12 are oval in shape, both having essentially the same shape and dimensions. In one panel (the outer panel 12 in the present embodiment), insertion holes 12a are provided, through which a stud bolt 21 (see FIG. 6) is inserted to attach the inflater 20 to the structure in the vehicle cabin. The insertion hole 12a is provided in the outer panel 12 so as to be in a position near the rear end of the vehicle when attached to the structure in the vehicle cabin. The cushion 10 contains the inflater 20, and is formed in the shape of a bag by sewing the periphery of the inner panel 11 and the outer panel 12 to each other in a state where the tip end part of the stud bolt 21 which secures the inflater 20 protrudes from the insertion hole 12a. FIG. 5 is a schematic diagram illustrating the joined state of each panel.

Note that, in the present embodiment, for simplicity, the configuration of the cushion 10 including the inner panel 11 and the outer panel 12 will be described. However, the inner panel 11 and the outer panel 12 may include panels separate from the inner panel 11 and the outer panel 12, as well as various auxiliary members used to reinforce or maintain the shape of the panels.

FIG. 6 is a schematic cross-sectional view of a cushion 10 provided in the side airbag device 1 in a stowed state. When a collision or the like of a vehicle does not occur, the cushion 10 of the side airbag device 1 is appropriately folded and stowed in a housing 50 provided in the structure between the rear seat S and the rear door. In the example of FIG. 6, the cushion 10 is illustrated as being folded and stowed in a spiral shape in the housing 50, but may be folded and stowed in a bellows shape.

The housing 50 includes a mounting surface 51 on which the side airbag device 1 is mounted, a circumferential surface 52 that extends from the periphery of the mounting surface 51 frontwards, and a cover 53 that covers the stowing space of the side airbag device 1 formed by the mounting surface 51 and the circumferential surface 52. In the present embodiment, the mounting surface 51 is a rear wall surface provided on the housing 50 on the rear side of the vehicle, and is an example of a wall surface of the structure facing the front of the vehicle on the side of the occupant.

The side airbag device 1 is attached to the mounting surface 51 by securing the inflater 20 encased by the cushion 10 to the mounting surface 51. The stud bolt 21 and the nut 22 are used to secure the inflater 20. The inflater 20 forms, for example, a cylindrical shape extending in the vertical direction. Internal threads for fastening the stud bolt 21 are formed on the upper end part and lower end part of the inflater 20. An insertion hole 12a through which the stud bolt 21 is inserted is provided in one of the panels constituting the cushion 10 (the outer panel 12 in the present embodiment). The insertion hole 12a is preferably provided at a position near the rear end when in an expanded and deployed state. Additionally, an insertion hole 51a through which the stud bolt 21 is inserted is also provided in the mounting surface 51 that makes up the housing 50. When the inflater 20 is secured to the mounting surface 51, the stud bolt 21 is arranged in the front-rear direction. The front end part of the stud bolt 21 is fastened to the internal threads provided in the inflater 20, and the rear end part protrudes rearward from the insertion hole 12a of the outer panel 12 and the insertion hole 51a of the mounting surface 51, and is fastened by the nut 22.

The cover 53 of the housing 50 is provided with a tear seam, burst seam, or the like that breaks under the action of a prescribed external force. The expansion and deployment of the cushion 10 occurs with the rupture of the cover 53.

Figure 7:
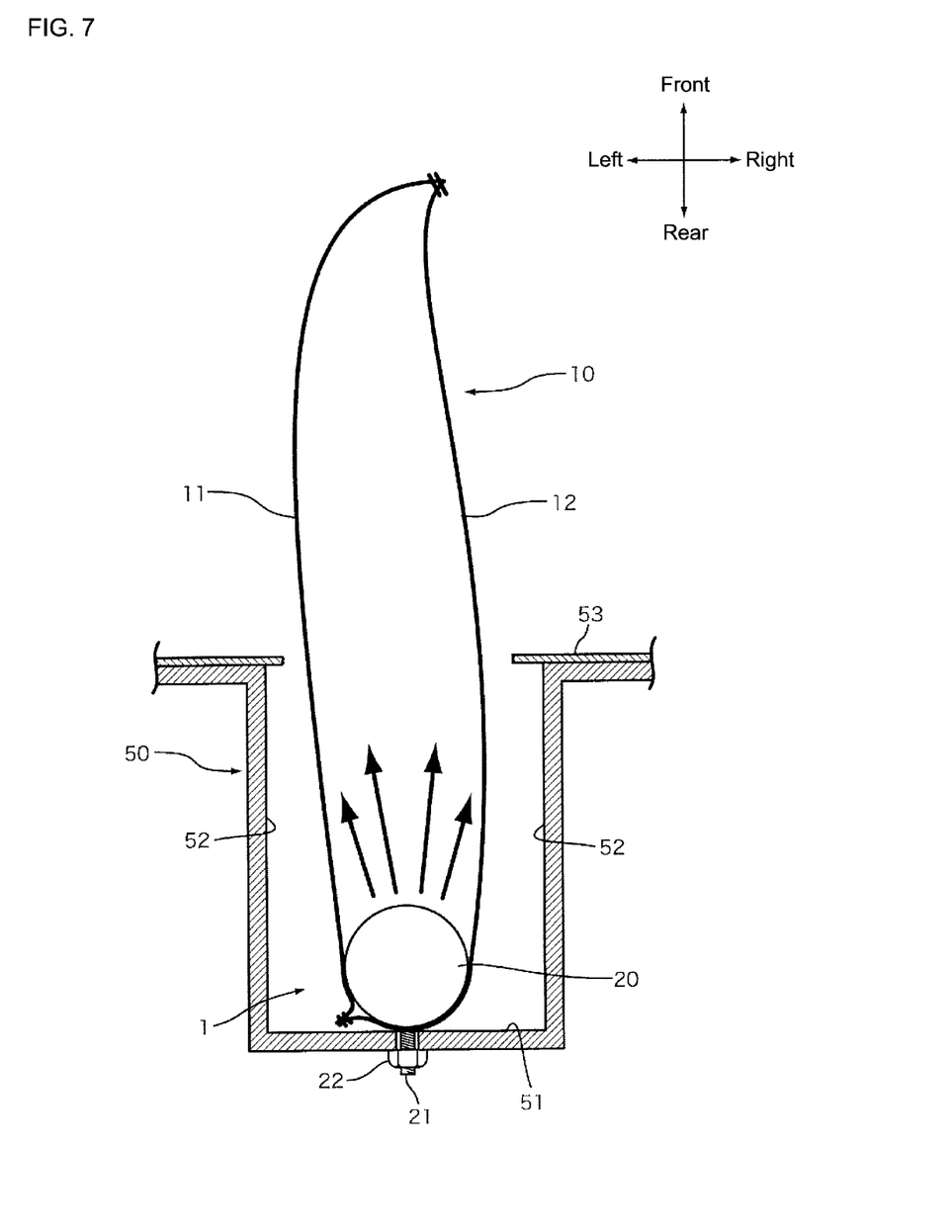
FIG. 7 is a schematic cross-sectional view illustrating the cushion equipped in the side airbag device in an exploded and expanded state.

The shape of the cushion 10 when expanded and deployed is described below. FIG. 7 is a schematic cross-sectional view illustrating the cushion 10 included in the side airbag device 1 in an expanded and deployed state. As described above, the inflater 20 contained within the cushion 10 operates in response to a collision or the like of the vehicle, and supplies gas for expanding and deploying the cushion 10. The cushion 10 expands and deploys toward the front of the vehicle inside the vehicle cabin through introduction of the gas supplied from the inflater 20. An insertion hole 12a is provided at a position near the rear end of the outer panel 12, and is secured together with the inflater 20 by the stud bolt 21. Thus, the length in the front-rear direction in which the outer panel 12 is deployed forward is shorter than the length in the front-rear direction in which the inner panel 11 is deployed forward. Thus, when gas is supplied from the inflater 20, the inner panel 11 and the outer panel 12 deploy forward, with the outer panel 12 extending to the fullest extent, and the front end part of the inner panel 11 which is longer than the outer panel 12 twists and expands in the direction of the outer panel 12 (rightward in the example of FIG. 7). As a result, the stitching line 13 at the front end of the cushion 10 is biased toward the outer panel 12.

As described above, in the present embodiment, when the cushion 10 expands and deploys, the length of the inner panel 11 and the outer panel 12 as seen from the stud bolt 21 are different in the front-rear direction. A longer panel in the front-rear direction (inner panel 11) is deployed to twist toward a shorter panel (outer panel 12 set with the inflater 20). Thus, in this embodiment, by asymmetrically attaching the inner panel 11 and the outer panel 12, the deployment direction of the cushion 10 can be controlled, so there is no need to provide a tether to adjust the expanded configuration or to adjust the folding process of the cushion. Thus, in the present embodiment, the number of parts can be reduced, and the assembly operation can be simplified.

Also, the longer panel (inner panel 11) in the front-rear direction is deployed so as to twist toward the shorter panel (outer panel 12), such that the stitching line 13 that stitches together the inner panel 11 and the outer panel 12 is biased toward the side of the outer panel 12 (or in other words the exterior side of the vehicle). As a result, even if the occupant is restrained by the cushion 10, contact with the panel end surface at which the stitching line 13 appears is avoided and discomfort is reduced.

In the present embodiment, a configuration has been described in which the inflater 20 provided in the side airbag device 1 is attached to a structure in the vehicle cabin, however, the attachment location of the inflater 20 is not limited to the structure in the vehicle cabin. For example, a configuration in which the inflater 20 is attached to any structure included in the vehicle such as a tire housing or the like can be used.

Embodiment 2

Figure 8:
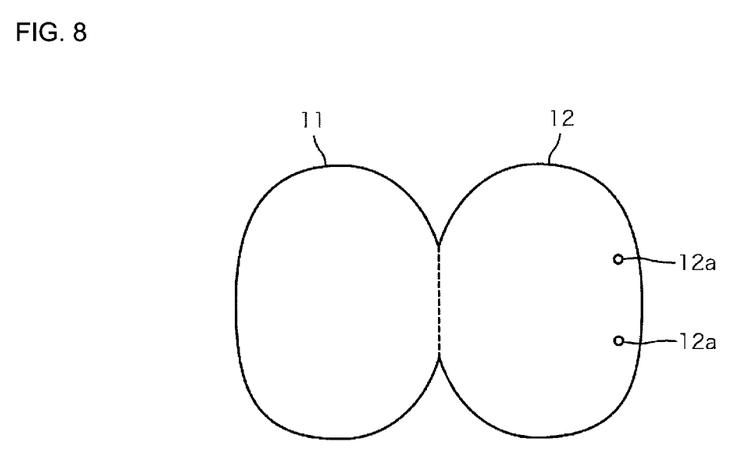
FIG. 8 is an expanded view of the cushion according to embodiment 2.
Figure 9:
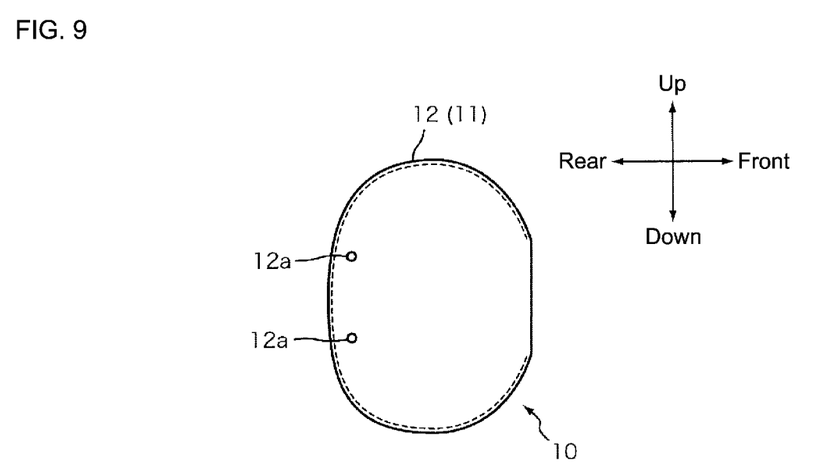
FIG. 9 is a schematic diagram illustrating the joined state of each panel.

FIG. 8 is an expanded view of the cushion 10 according to embodiment 2, and FIG. 9 is a schematic diagram illustrating each of the panels in a joined state. FIG. 8 is a simplified view illustrating the inner panel 11 and the outer panel 12 that make up the cushion 10 prior to joining according to embodiment 2. Both the inner panel 11 and the outer panel 12 are oval in shape, both having essentially the same shape and dimensions. In addition, in embodiment 2, some regions are common, and the inner panel 11 and the outer panel 12 are integrally formed.

In one panel (the outer panel 12 in the present embodiment), an insertion hole 12a is provided through which a stud bolt 21 is inserted to attach the inflater 20 to the vehicle cabin structure. The insertion hole 12a is provided in the outer panel 12 so as to be in a position near the rear end of the vehicle when attached to the structure in the vehicle cabin. The cushion 10 houses the inflater 20, and is formed in the shape of a bag by sewing the periphery of the inner panel 11 and the outer panel 12 excluding the integrated regions in a state where the tip end part of the stud bolt 21 for securing the inflater 20 protrudes from the insertion hole 12a.

Note that expansion and deployment the shape of the cushion 10 according to embodiment 2 is the same as that of embodiment 1, however, as there is a region that is not sewn together, if the panel end surface does not contact the occupant, insertion holes can be provided on the inner panel 11 and the cushion 10 can be secured inside the housing 50 by the stud bolt 21 together with the inflater 20.

In embodiment 2, the region where the inner panel 11 and the outer panel 12 are integrated is configured to face the front of the vehicle when the cushion 10 expands and deploys. Therefore, the stitching line is less likely to contact the occupant during expansion and deployment of the cushion 10 and the occupant is less likely to receive injuries such as abrasions.

The embodiments presently disclosed are to be considered as examples for all points, and are not restrictive. The scope of the present invention is not intended to be based on the meaning of that described above, but by the Scope of the patent Claims, and includes all changes in the meaning and scope equivalent to the Scope of the patent Claims.

EXPLANATION OF CODES

1 Side airbag apparatus
10: Cushion

11: Inner panel
12: Outer panel
12a: Insertion hole
13: Stitching line
20: Inflator
21: Stud bolt
22: Nut
50: Housing
51: Mounting surface
51a: Insertion hole
52: Circumferential surface
53: Cover
S: Rear seat
SA: Side trim

The invention claimed is:

1. A side airbag device comprising:
a cushion configured to expand and deploy toward a front of a vehicle in a vehicle cabin to restrain an occupant seated in a seat from a lateral side, and
an inflator encased in the cushion and operative to supply the gas for expanding and deploying the cushion,
wherein the cushion is provided with a first panel configured to face a first lateral direction in an expanded and deployed state and a second panel joined to the first panel configured to face in a second lateral direction,
wherein an insertion hole is provided at a position near a rear end of one of the first and second panels and a stud bolt is inserted for fastening the inflator to a vehicle structure,
wherein the cushion is attachable to a wall facing toward the front of the vehicle together with the inflator using the stud bolt, and
wherein a first length of the first panel in a front-rear direction in which the cushion is deployed forwardly is greater than a second length of the second panel in the front-rear direction such that a first front end part of the first panel is longer than the front end part of the second panel in the front-rear direction and the first panel twists and upon deployment of the cushion to extend toward the second panel.

2. The side airbag device according to claim 1, wherein a housing is further provided in which the cushion and the inflator are stowed and is attachable to the structure, and where the wall surface is a rear wall surface of the housing that is toward a rear of the vehicle.

3. The side airbag device according to claim 1, wherein the first panel and the second panel are joined by sewing.

4. The side airbag device according to claim 3, wherein the stitching lines of the first panel and the second panel are biased toward a side of one of the panels when the cushion expands and deploys.

5. The side airbag device according to claim 1, wherein the first panel and the second panel have essentially a same shape and dimensions.

6. The side airbag device according to claim 1, wherein the first panel and the second panel are made up of one base material, and the first panel and the second panel are integrated in the portion of the cushion towards a front of the vehicle upon expansion and deployment of the cushion.

7. The side airbag device according to claim 1, wherein the side airbag device is a side airbag device for a rear seat provided in a rear seat of a vehicle.

8. The side airbag device according to claim 1, wherein the first panel is connected to the second panel at a forward edge of the cushion along a stitching line and the stitching line is biased toward the second panel.

9. The side airbag device according to claim 1, wherein the first panel is an inner panel arranged to face toward the occupant of the seat and the second panel is an outer panel arranged to face away from the occupant.

* * * * *